United States Patent Office 3,481,797
Patented Dec. 2, 1969

3,481,797
METHOD FOR OPERATING CHEMICAL PROCESSING SOLUTIONS
James F. Leland, Detroit, and William S. Russell, Warren, Mich., assignors to Hooker Chemical Corporation, Niagara Falls, N.Y., a corporation of New York
No Drawing. Filed Aug. 17, 1966, Ser. No. 572,907
Int. Cl. C23f 7/26, 7/08, 7/18
U.S. Cl. 148—6.14                   9 Claims

ABSTRACT OF THE DISCLOSURE

A method for replenishing metal coating solutions, such as chromate, phosphate or oxalate solutions. Two replenishing solutions are used, one containing the components in ratios and amounts suitable to compensate for physical loss in the coating solution and the other to compensate for chemical losses. The two replenishing solutions are added in relative amounts which will maintain the components of the coating solution in substantially the same ratios and amounts as originally formulated.

---

This invention relates to an improved method for operating processes for forming chemical coatings on metal surfaces, and more particularly it relates to improvements in methods for maintaining and controlling the ratio and concentration of the chemical components of metal processing solutions.

In the coating of metal surfaces with chemically reactive coating solutions, particularly those containing hexavalent chromium, it is known that a particular range of concentration of the various components of the coating solution should be maintained in order to obtain optimum coating results. Thus, in using these coating solutions they are initially made up to contain a certain concentration of the coating components which is within the desired range to produce an acceptable coating. During the use of the coating solution, the concentration of the components is determined at regular intervals, either manually or by automatic control means. As metal surfaces are treated with the coating solution, the solution components react with the metal and are depleted. Additionally, coating solution is physically removed from the coating bath by drag-out or entrapment in and on the metal surface. The makeup of the coating solution is thus varied, and when this variation in solution concentration and component ratios departs sufficiently from the range for producing a suitable coating, replenishment of the coating solution is necessary. As with the analysis of the solution, this may be done manually or by automatic means.

One method of replenishing such coating solutions is to add replenishing chemicals in substantially the exact amounts and ratios which are needed in order to make up for the chemicals lost by reaction and dragout, thus returning the coating bath to its original makeup. Although by this method the coating bath would be maintained at substantially the exact optimum concentration, such a method necessitates literally thousands of different replenishing solutions, inasmuch as the depletions in the bath concentration and changes in component ratios will vary in each instance, depending upon the characteristics of the particular coating line, the coating rate and coating weights which are used, and the quantity of surface metal at the production rate being treated. Accordingly, this technique for replenishing the chemical coating solutions is not practical and has not been used in the past.

Alternatively, a single replenishing solution may be prepared which contains the various solution components in the approximate ratios in which they are consumed by chemical reaction of the solution with the metal surface. When using this replenishing solution, however, the coating solution concentration and component ratios cannot be maintained at exactly the desired level, inasmuch as there is no compensation for other solution losses, particularly physical ones. Thus, since this method gives only an approximation of the desired coating solution concentration and component ratio, the quality of the coating produced will vary as these ratios and concentrations vary from the optimum. Although this method of replenishing has been extensively used in the past, it is, obviously only a compromise and has not been completely satisfactory, as the shift in solution equilibrium causes substantial changes in the coating weight produced.

It is, therefore, an object of the present invention to provide an improved method for operating chemically reactive metal coating solutions.

Another object of the present invention is to provide an improved method for controlling the concentration and component ratios of a chemically reactive metal coating solution.

A further object of the present invention is to provide a control method as set forth hereinabove wherein the metal coating solution concentration and component ratios are easily maintained at substantially the exact level necessary to give optimum coating results.

These and other objects will become apparent to those skilled in the art from the description of the invention which follows.

Pursuant to the above objects, the present invention includes a method for operating a process for chemically coating a metal surface which comprises formulating an aqueous solution suitable for forming a reactive chemical coating on a metal surface, said solution containing coating components and accelerating components in a ratio suitable to form a chemical coating having the desired composition and weight on a metal surface contacted with the coating solution, contacting the metal surface with the thus-formulated coating solution, maintaining the coating solution in contact with the metal surface for a period sufficient to form the desired chemically reactive coating thereon, periodically replenishing the coating solution by adding thereto a first replenishing composition containing coating components and accelerating components in substantially the same ratio contained in the coating solution as originally formulated, and a second replenishing composition containing coating components and accelerating components in a ratio suitable to compensate for these components which have been depleted in the coating solution by reaction with the metal surface in forming the chemically reactive coating thereon, and adjusting the ratio between the two replenishing compositions so that the concentration and ratio of coating components and accelerating components in the coating solution is maintained substantially as originally formulated. By operating in this manner, the chemical coating solutions are consistently maintained with the desired amount and ratios of the operating components to give optimum coating efficiency and quality.

More specifically, in the practice of the method of the present invention, the chemical coating solutions used are preferably those wherein the components of the replenishing compositions can be added as a solution. Although, coating solutions in which the replenishing compositions are added as a dispersion, paste, slurry, powder or the like, may also be used in the present method. For ease and simplicity of handling, the addition of the replenishing compositions as solutions is preferred. Exemplary of such coating solutions are the chromate coating solutions, such as those based on chromic acid, combinations of chromic acid and phosphoric acid, and the like. Desirably, these solutions may also contain one or more activating materials, as are known in the art, such as fluoride ions. Typically, these coating solutions are used in the treatment of aluminum surfaces to provide protective and/or paint base coatings thereon.

Other coating solutions which may be used include oxalate coating solutions, e.g., those based on oxalic acid, alkali metal oxalates or the like, phosphate coating solutions, such as those containing alkali metal phosphates, e.g. the so-called "iron phosphate" coating process solutions, zinc phosphates and the like. Such coating solutions may be used in the treatment of ferrous metal surfaces, aluminum and zinc surfaces to provide a protective and/or paint base coating thereon. It is to be appreciated that other types of coating solutions including those useful in treating metals other than those set forth above, may also be used in the present process, chemical treating solutions of these types being known to those in the art.

The coating solutions used are formulated so as to contain the solution components, i.e., the coating and accelerating components, in the amounts and relative ratios which will provide the desired optimum coating results. Obviously, the exact quantities and ratios used will vary in each instance, depending upon the particular chemical coating solution which is used. For example, when using a fluoride activated, chromic acid based solution, suitable for treating aluminum surfaces, hexavalent chromium concentrations, calculated as $CrO_3$, within the range of about 0.05 to about 2%, and active fluoride ion concentrations, within the range of about 0.01 to 1%, are typical. Similarly, in fluoride activated chromic acid-phosphoric acid solutions useful in treating aluminum surfaces, the hexavalent chromium concentrations, calculated as $CrO_3$, is typically within the range of about 0.05 to about 2%, the phosphate concentration calculated as $H_3PO_4$, is within the range of about 0.1 to about 5%, and the active fluoride ion concentration is within the range of about .01 to about 1%. Preferred coating solutions of the above type are exemplified by the following.

| Component: | (A) | Percent by wt. |
|---|---|---|
| $CrO_3$ | | 0.20 |
| HF | | 0.03 |

| | (B) | |
|---|---|---|
| $CrO_3$ | | 0.20 |
| $H_3PO_4$ | | 0.80 |
| HF | | 0.08 |

Exemplary of other coating solutions which may also be used are those which contain the following components in amounts within the ranges indicated.

| Component: | (C) | Percent by wt. |
|---|---|---|
| $Zn(H_2PO_4)_2$ | | 0.1–5 |
| $H_3PO_4$ | | 0.02–1.6 |
| $Zn(NO_3)_2$ | | 0.4–4.5 |

| | (D) | |
|---|---|---|
| $NaH_2PO_4$ | | .06–3 |
| $Na_2HPO_4$ | | .04–2 |
| $NaClO_3$ | | 0.1–5 |

| | (E) | |
|---|---|---|
| $H_2C_2O_4$ | | 0.2–5 |
| NaCl | | 0.2–4 |
| $NaHF_2$ | | 0.2–3 |
| $Na_2S_2O_3$ | | 0.04–1 |

| | (F) | |
|---|---|---|
| $Zn(H_2PO_4)_2$ | | 0.1–5 |
| $H_3PO_4$ | | 0.02–1.6 |
| $Zn(NO_3)_2$ | | 0.4–4.5 |
| $ZnSiF_6$ | | 0.1–4 |
| $Ni(NO_3)_2$ | | 0.1–3 |

| | (G) | |
|---|---|---|
| $CrO_3$ | | 0.1–1 |
| $Na_2M_0O_4$ | | 0.03–0.3 |
| HF | | 0.03–0.3 |

It is to be appreciated that in the above solutions, as is known to those in the art, the phosphate, chromium and oxalate materials are the coating components of the solution, whereas the nitrate and chlorate materials, as well as others such as molybdates, halides, bromates, nickel, silico fluorides and the like are the accelerating components.

The coating solutions may be formulated using various suitable sources of the coating and/or accelerating components which make up the solution. For example, the hexavalent chromium ions in the solutions may be provided by using chromic acid, the phosphate ions may be provided by the use of phosphoric acid, zinc phosphates, alkali metal phosphates, and the fluoride ion accelerator may be added as hydrogen fluoride (hydrofluoric acid), oxalate ions may be added as oxalic acid, while the nitrate may be added as zinc or alkali metal nitrate and chlorates as the alkali metal chlorate, or the like. Inasmuch as these coating solutions are desirably aqueous solutions, the materials used are desirably soluble, or at least dispersible, in water, so as to provide the desired solution. In selecting water-soluble salts to supply the various coating and accelerating components, such as the alkali metal and ammonium salts and the like, care should be taken that other extraneous ions are not introduced into the coating solution which may be detrimental either to the coating solution or to the coating produed on the metal surfaces treated. Accordingly, it may be preferable to formulate these coating solutions using chromic acid as the source of hexavalent chromium ions, phosphoric acid or zinc phosphate as the source of phosphate ions, oxalic acid as the source of oxalate ions, hydrofluoric acid, as the source of active fluorine in the composition, and the like.

The thus-formulated coating solutions may be applied to the metal surface to be treated in any convenient manner, as for example, by spraying, immersion, flowing, and the like. In many instances, the application of these coating solutions is preferably effected either by immersing the metal surface to be coated in the solution or by spraying the solution on the surface. As the metal surface to be treated and particularly, aluminum surfaces, are brought in contact with the treating solution, the coating components of the solution, e.g., the hexavalent chromium and the phosphate ions, react with the metal surface, thus forming a protective coating thereon. This reaction is accelerated by the active fluoride ions in the solution. The products of this reaction include trivalent chromium ions as well as aluminum fluoride complex ions, both of which reactant products are substantially soluble in the coating solutions. As this reaction takes place, it is, of course, apparent that both the coating components and accelerating components of the treating solution are depleted, to the extent that the reaction has taken place. Additionally, as the metal surfaces are removed from contact with the coating solution, some of the coating solution will be physically removed from the main body of the coating solution by "drag-out," including entrapment in and on the metal article being treated. As a result of this physical loss of the coating solution, as well as the chemical consumption of the coating and accelerating components of the solution, the concentration of these components in the solution, as well as their relative ratios are changed from those originally established as being optimum in the treating solution. When this takes place, there is a change in both the quality and quantity of the coating which is produced on the metal surface, and it then becomes necessary to replenish the treating solution so as to reestablish the solution components in the desired quantities and ratios to produce the optimum coating results. In each instance, the quantities and ratios needed may be determined by product performance, coating weights produced, chemical analysis of the coating solution or the like.

In the present method, this replenishing is effected by utilizing a combined replenishing material made up of two replenishing solutions. These two replenishing solutions, although having the same components, contain these components in different quantities and relative ratios. The first of the replenishing solutions, which will be referred to hereinafter for convenience as the physical replenishing solution, contains the coating and accelerating components in the same ratio in which they are contained in the original coating solution. For convenience, however, the quantity of the components in this replenishing solution is greater than that in the original treating bath, that is, the replenishing solution is more concentrated than the original treating solution. Thus, for example, where the treating solution used contains chromic acid, phosphoric acid, and hydrogen fluoride, in amounts as have been indicated hereinabove, the physical replenishing solution may contain these components in the following amounts.

| Components: | Percent by wt. |
|---|---|
| Chromic acid | 3–15 |
| Phosphoric acid | 5–50 |
| Hydrofluoric acid | 0.7–30 |

It is to be appreciated, however, that the above concentrations are merely exemplary of those which may be used, and that, depending upon the particular treating solutions used, other components and component quantities may also be used. In general, it is preferred that the physical replenishing solution contains the same coating and accelerating components as the treating solution, and in the same relative ratios, but in quantities or amounts which are from 5 to 30 times the amounts as contained in the treating solution.

The second replenishing solution, which is referred to hereinafter for convenience as the chemical replenishing solution, also contains the same components as are present in the metal treating solution. In this replenishing solution, however, the ratio of these components is not the same as in the original treating solution but, rather, is a ratio based on the depletion of these components in the coating solution as a result of the chemical reaction with the metal surface treated. Thus, the ratio of the coating components and accelerating components in this replenishing solution will be such as to compensate for the components which have been depleted in chemically reacting with the metal surface to form the chemically reactive coating thereon. Generally, as with the physical replenishing solution, the actual amounts of the components in the chemical replenishing solution will be greater than that in the original treating solution so that this solution is also more concentrated than the original metal treating solution. Where the metal treating solution used contains chromic acid, phosphoric acid and hydrofluoric acid, the chemical replenishing solution will typically contain these components in the following amounts:

| Components: | Percent by wt. |
|---|---|
| Chromic acid | 3–15 |
| Phosphoric acid | 1–30 |
| Hydrofluoric acid | 3–30 |

It is to be appreciated, of course, that this is merely exemplary of the chemical replenishing solutions that will be used and that the concentration given may be varied, depending upon the particular solutions which are used.

In using these solutions to replenish the metal treating bath, the first or physical replenishing solution and the second or chemical replenishing solution are added in a ratio so that when the two solutions are added to the treating bath, the coating and accelerating components in the coating solution will be maintained in substantially the same concentration and ratios as originally formulated. The desired ratio of the two replenishing solutions may be established for each line by determining the amount of physical loss of the coating solution which occurs on the line, with the particular parts being coated and by determining the coating weight which is desired to be obtained on the metal surfaces treated. The first of these determinations will establish the amount of the physical replenishing solution which is necessary while the second will establish the amount of chemical replenishing solution needed. Once this ratio has been determined, the two replenishing solutions can be continually added in this ratio, to the treating solution or bath as is required to compensate for the physical and chemical depletion of the bath components during use.

Although the actual ratios of the physical and chemical replenishing solutions will vary considerably, depending upon the characteristics of the particular line, the coating weights desired, as well as the concentration of the respective replenishing solutions, in many instances, the ratio of the physical replenishing solution to the chemical replenishing solution is typically within the range of about 8/1 to about 1/10. Obviously, however, as the conditions heretofore enumerated vary, other ratios of these replenishing solutions may also be used.

In operating the process of the present invention, the metal coating solution may be periodically analyzed to determine when the addition of the combined replenishing material is required and, thereafter, the replenishing material may be added, manually, as is necessary to maintain the solution components in the desired quantity and ratio for optimum coating efficiency. In many instances, however, rather than utilizing manual analyses and addition of the combined replenishing solution, the addition of the replenisher may be effected automatically, by continual automatic control of the solution. For such automatic control, the conductivity, pH, color, turbidity of the solution, the concentration of one or more ions in the solution, or the like, are automatically measured as the metal treating solution is used. A usable range of the particular bath characteristic being measured, such as conductivity or the like, which will provide a suitable component concentration and ratio in the bath for optimum coating, has previously been determined. This desired range of concentration for the solution is then set up on automatic control equipment so that when the bath concentration varies from the pre-set range, an electrical circuit will be energized which activates a pumping system which supplies the physical and chemical replenishing solutions in the proper ratios, as has been previously established, until the desired concentration and ratio of the components in the treating bath is reestablished. Although, as has been noted, various characteristics of the treating solution may be measured, in many instances when using a chromic acid, phosphoric acid, hydrofluoric acid treating solution, the automatic control of the bath is preferably effected by measuring the conductivity of the bath. Other bath characteristics, however, may also be utilized, as the basis for a similar automatic control of the operating solution.

It is to be further appreciated, that if desired, where the treating solution used is the chromic acid, phosphoric acid, hydrofluoric acid type, as has been described hereinabove, these solutions may be operated in conjunction with an ion exchange unit of the type, and by the procedures described, in U.S. Patent 2,967,791, issued Jan. 10, 1961. The use of such an ion exchange unit, which employs a cationic exchange resin, is effective in maintaining the solutions free of metallic ions other than aluminum, which occur in the solution as an aluminum fluoride complex, the concentration of which complex is also controlled in the solution by the ion exchange unit. When such a unit is used, however, its effect on the treating solution, in terms of the concentrations and ratio of the coating and accelerating components of the solution will have to be taken into account in determining the makeup of the two replenishing solutions used, as well as the ratio of these solutions to each other. Accordingly, it is to be appreciated that in the description of the process of the present invention, where reference is made to providing a replenishing solution which will compensate for the chemical consumption of the solution components in coating the metal surfaces to be treated, it is intended to include both the actual consumption which occurs when operating without an ion exchange unit as well as the "adjusted" consumption which results from the partial regeneration of the solution by the use of an ion exchange unit. This does not, however, effect the operation of the process of the present invention, but merely the mechanics of determining the makeup and ratios of the replenishing solutions used.

In order that those skilled in the art may better understand the present invention and the manner in which it may be practiced, the following specific examples are given. In these examples, unless otherwise indicated, temperatures are in degrees centigrade and parts and percents are by weight. Additionally, it is to be appreciated that these examples are merely exemplary of the method of the present invention and are not to be taken as a limitation thereof.

EXAMPLE 1

An aqueous coating solution was formulated containing 0.35% chromic acid, 1.37% phosphoric acid, and 0.04% active fluorine added as hydrofluoric acid. Clean, aluminum can bodies, were coated with this solution by spraying for 10 seconds at a temperature of 46° centigrade. A coating weight of 5 milligrams per square foot was obtained on the aluminum surface, which gave a total consumption of coating solution of 0.18 lb. per 1000 sq. feet of surface treated and a coating rate of 0.5 milligram per square foot per second. Two replenishing concentrate solutions were formulated, the first or physical replenishing concentrate was an aqueous solution containing 13.4% $CrO_3$, 48.7% $H_3PO_4$ and 1.9% HF, while the second or chemical replenishing concentrate was an aqueous solution containing 13.4% $CrO_3$, 4.5% $H_3PO_4$ and 14.4 HF. The operating solution was replenished with these two concentrate materials by adding them to the operating solution in the ratio of four parts of the physical replenishing material to one part of the chemical replenishing material. These replenishing concentrates were added to the operating bath both continuously and at intervals of 36 seconds to several minutes, and in all cases, the bath concentration and component ratios were maintained substantially at the level as originally formulated. A total of 15,000,000 square feet of the aluminum can bodies was treated and there was continually produced on the can bodies a satisfactory paint-base coating.

EXAMPLE 2

A coating solution was prepared containing the following components in the amounts indicated.

| Component: | Percent by wt. |
|---|---|
| $CrO_3$ | 0.35 |
| $H_3PO_4$ | 1.40 |
| HF | 0.08 |
| $H_2O$ | Balance |

This solution was applied by spraying at about 38° centigrade in a strip line for 6 seconds on 42 inch wide aluminum strip, 5052 alloy, which strip was traveling at about 200 feet/minute. The coating solution was replenished as required by the addition thereto of the following two replenishing solutions, A and B, which were added in the ratio of 3 parts A to 1 part B:

(A) Chemical replenishing solution

| Component: | Percent by wt. |
|---|---|
| $CrO_3$ | 13.4 |
| $H_3PO_4$ | 4.5 |
| HF | 14.4 |
| $H_2O$ | Balance |

(B) Physical replenishing solution

| Component: | Percent by wt. |
|---|---|
| $CrO_3$ | 13.4 |
| $H_3PO_4$ | 53.6 |
| HF | 3.07 |
| $H_2O$ | Balance |

The control of the solution was maintained automatically by measuring the solution conductivity, the replenishing solutions being added when the conductivity dropped below 10 millimhos. In this manner, the coating solution was maintained at substantially the same component concentration and ratio as originally formulated, and there was continually produced an excellent paint base coating on the aluminum strip.

EXAMPLE 3

The processing solution was prepared containing the following components in the amounts indicated.

| Component: | Percent by wt. |
|---|---|
| $NaH_2PO_4$ | 0.84 |
| $Na_2HPO_4$ | 0.50 |
| $NaClO_3$ | 0.60 |
| $H_2O$ | Balance |

This solution was applied to steel automobile fenders in a monorail installation by spraying at a temperature of about 70° centigrade for 1 minute. A coating weight of about 50 milligrams/square foot was produced on the metal surface. Two replenishing concentrate solutions were prepared as follows.

(A) Physical

| Component: | Percent by wt. |
|---|---|
| $NaH_2PO_4$ | 16.8 |
| $Na_2HPO_4$ | 10.0 |
| $NaClO_3$ | 12.0 |
| $H_2O$ | Balance |

(B) Chemical

| Component: | Percent by wt. |
|---|---|
| $H_3PO_4$ | 36.8 |
| $NaClO_3$ | 1.34 |
| $H_2O$ | Balance |

The processing solution was periodically replenished with these solutions by adding them to the processing solution in a ratio of 2.4 parts of A to 1 part of B. The addition of the two replenishing solutions was made as required to maintain the component concentration and ratios of the processing solution substantially as originally formulated, based on continual measurements of the conductivity of the processing solution.

EXAMPLE 4

A processing solution was prepared containing the following components in the amounts indicated.

| Component: | Percent by wt. |
|---|---|
| $Zn(H_2PO_4)_2$ | 1.0 |
| $H_3PO_4$ | 0.25 |
| $Zn(NO_3)_2$ | 1.52 |
| $H_2O$ | Balance |

This solution was applied to steel automobile door panels by spraying at about 77° centigrade for 1 minute. A coating of about 150 milligrams/square foot was produced on the metal surface.

Two replenishing concentrate solutions were prepared as follows:

Components: Percent by wt.

(A) Physical

| | |
|---|---|
| $Zn(H_2PO_4)_2$ | 15.0 |
| $H_3PO_4$ | 3.75 |
| $Zn(NO_3)_2$ | 22.8 |
| $H_2O$ | Balance |

(B) Chemical

| | |
|---|---|
| $Zn(H_2PO_4)_2$ | 28.5 |
| $H_3PO_4$ | 19.2 |
| $Zn(NO_3)_2$ | 7.6 |
| $H_2O$ | Balance |

These were added, in a ratio of 1 part A to 1.2 parts B, to the processing solution as required to maintain the component ratios and concentration substantially as originally formulated. The additions were made automatically based on the continual measurement of the conductivity of the processing solution.

EXAMPLE 5

A processing solution was prepared containing the following components in the amounts indicated.

Components: Percent by wt.

| | |
|---|---|
| $Zn(H_2PO_4)_2$ | 1.0 |
| $H_3PO_4$ | 0.25 |
| $Zn(NO_3)_2$ | 1.06 |
| $ZnSiF_6$ | 0.60 |
| $Ni(NO_3)_2$ | 0.60 |
| $H_2O$ | Balance |

This solution was applied, by spraying, to hot dip galvanized automobile rocker panels. The solution was at a temperature of about 65° centigrade and the spray time was 1 minute. A coating of about 200 milligrams/square foot was formed on the panels.

Two replenishing concentrate solutions were prepared as follows:

Components: Percent by wt.

(A) Physical

| | |
|---|---|
| $Zn(H_2PO_4)_2$ | 15.0 |
| $H_3PO_4$ | 3.75 |
| $Zn(NO_3)_2$ | 15.9 |
| $Ni(NO_3)_2$ | 9.0 |
| $ZnSiF_6$ | 9.0 |
| $H_2O$ | Balance |

(B) Chemical

| | |
|---|---|
| $Zn(H_2PO_4)_2$ | 28.5 |
| $H_3PO_4$ | 9.6 |
| $Zn(NO_3)_2$ | 7.6 |
| $Ni(NO_3)_2$ | 1.2 |
| $ZnSiF_6$ | 1.6 |
| $H_2O$ | Balance |

These were added in a ratio of 1 part A to 1.5 parts B to the operating solution. The additions were made continually, based on automatic measurement of the solution conductivity, and the component ratios and concentrations in the operating solution were maintained substantially as originally formulated.

EXAMPLE 6

A processing solution was prepared containing the following components in the amounts indicated.

Components: Percent by wt.

| | |
|---|---|
| $CrO_3$ | 0.25 |
| $Na_2MoO_4$ | 0.10 |
| $HF$ | 0.12 |

This solution was applied to aluminum in a strip line by spraying for 10 seconds at about 56° centigrade, to produce a paint-base coating.

Two replenishing concentrate solutions were prepared as follows:

Components: Percent by wt.

(A) Physical

| | |
|---|---|
| $CrO_3$ | 7.5 |
| $Na_2MoO_4$ | 3.0 |
| $HF$ | 3.6 |
| $H_2O$ | Balance |

(B) Chemical

| | |
|---|---|
| $CrO_3$ | 7.5 |
| $Na_2MoO_4$ | 0.8 |
| $HF$ | 3.4 |
| $H_2O$ | Balance |

These were added, to the operating solution in a ratio of 1 part A to 9 parts B. The additions were made continually, based on automatic measurement of the solution conductivity and the component ratios and concentrations in the operating solution were thus maintained substantially as originally formulated.

In this example, the molybdate activator may be replaced with $K_3Fe(CN)_6$ to obtain similar results. In so doing, however, the $K_3Fe(CN)_6$ would not be incorporated in the replenishing concentrate solutions, because of stability difficulties, but would be added separately in direct ratio to the chemical replenishing material.

EXAMPLE 7

A treating solution was built up, as in Example 1, in a conveyorized spray washer having a conventional alkaline cleaning, rinsing and conversion coating stages. The solution was built up using the physical replenishing material concentrate. This solution produced a 20 ml. titration for total acid when a 10 ml. sample was titrated with 0.1 N NaOH using phenol phthalein indicator.

A portion of the solution to be sprayed on the ware was passed through a conductivity cell which charted 10 millimhos on a dynalog recorder and controller. When the conductivity dropped below the established value, a circuit was actuated causing two metering pumps to simultaneously add the physical and chemical replenishing solutions, as set forth in Example 1, until such time as the concentration had been restored. By adjusting the flow rate of these pumps a ratio of addition was established of about 4 parts of A physical, to 1 part of B chemical, which maintained a uniform coating weight. In this manner, coating weights of 5–6 milligrams/square foot were consistently produced by spraying the parts for 9 seconds at a temperature of about 45° centigrade.

It was found that with marked changes in production rate, or changes in mechanical loss due to overspray, solution leaks, or inadequate blowoff, by adjusting the ratio of the two replenishing materials, namely physical and chemical, and all these changes could be compensated for and the original solution analysis maintained.

Thus, once the replenishing delivery rates had been established on a given piece of spray equipment, at a given production rate, any change in equipment efficiency or production rate could be detected and compensated for by varying the percentage time interval, of the total, which the chemical replenishing was added. The percentage of time was controlled manually from coating weight determinations and automatically from rate of production with equal success.

It was also found that when the main body of the coating solution was of sufficient volume to undergo only slow changes in both balance, with changes in production, over a given period, addition ratios could be made compensating on the basis of the previous shifts production.

With this mode of operation coating weights were held much closer than possible with similar equipment using conventional replenishing methods based on frequent lab analysis and corrective additions. Additionally in no case was it necessary to make side additions of chemicals to correct the solution balance. At all times it was possible to restore original bath balance and coating weight by the simple expedient of adjusting the ratio of the chemical and physical replenishing while maintaining the overall concentration.

While there have been described various embodiments of the invention, the compositions and methods described are not intended to be understood as limiting the scope of the invention, as it is realized that changes therewithin are possible and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A method for operating a process for chemically coating a metal surface which comprises formulating an aqueous solution suitable for forming a reactive chemical coating selected from chromate, phosphate and oxalate coatings on a metal surface, said solution containing coating components and accelerating components in a ratio suitable to form a chemical coating having the desired composition and weight on a metal surface contacted with the solution, contacting the metal surface with the thus-formulated coating solution, maintaining the solution in contact with the metal surface for a period sufficient to form the desired chemically reacted coating thereon, periodically replenishing the coating solutions by adding thereto a first replenishing composition containing coating components and accelerating components in substantially the same ratio contained in the coating solution as originally formulated and a second replenishing composition containing components and accelerating components in a ratio suitable to compensate for these components which have been depleted in the coating solution by reaction with the metal surface in forming the chemically reacted coating thereon, and adjusting the ratio between the two replenishing solutions so that the concentration and ratio of coating components and accelerating components in the coating solution is maintained substantially as originally formulated.

2. The method as claimed in claim 1 wherein the chemical coating solution used is one in which the replenishing compositions added are in the form of aqueous solutions.

3. The method as claimed in claim 2 wherein the chemical coating solution used is an aqueous solution containing hexavalent chromium ions, and phosphate ions, as coating components and active fluoride ions as accelerating components.

4. The method as claimed in claim 3 wherein the aqueous coating solution contains hexavalent chromium ions, calculated as $CrO_3$ in amounts within the range of about 0.05 to about 2%, phosphate ions calculated as $H_3PO_4$ in an amount within the range of about 0.1 to about 5%, and fluoride ions in an amount within the range of about 0.01 to about 1%.

5. The method as claimed in claim 4 wherein the first replenishing composition is an aqueous concentrate containing $CrO_3$ in an amount within the range of about 3 to about 15%, $H_3PO_4$ in an amount within the range of about 5 to about 50%, and active fluoride ions in an amount within the range of about 0.7 to about 30% and the second replenishing composition is an aqueous concentrate containing $CrO_3$ in an amount within the range of about 3 to about 15%, $H_3PO_4$ in an amount within the range of about 1 to about 30%, and active fluoride ions in an amount within the range of about 3 to about 30%.

6. The method as claimed in claim 5 wherein the ratio of the first replenishing concentrate to the second replenishing concentrate in the replenishing material added to maintain the coating solution at the desired level is within the range of about 8:1 to about 1:10.

7. The method as claimed in claim 6 wherein the addition of the replenishing solution to the coating solution is controlled automatically.

8. The method as claimed in claim 7 wherein the automatic control is effected by measuring the conductivity of the coating solution.

9. The method as claimed in claim 2 wherein the processing solution contains 0.1 to 1% $CrO_3$, 0.03 to 0.3% $Na_2MoO_4$ and 0.03 to 0.3% HF.

References Cited

UNITED STATES PATENTS

| | | | |
|---|---|---|---|
| 2,472,864 | 6/1949 | Spruance et al. | 148—6.16 |
| 2,970,935 | 2/1961 | Cavanagh | 148—6.16 |
| 3,095,121 | 6/1963 | Douty et al. | 148—6.2 X |
| 3,214,301 | 10/1965 | Pocock et al. | 148—6.2 |
| 3,401,065 | 9/1968 | Steinbrecher et al. | 148—6.15 |

RALPH S. KENDALL, Primary Examiner

U.S. Cl. X.R.

148—6.15, 6.16, 6.2